United States Patent [19]
Gallacher et al.

[11] Patent Number: 6,021,400
[45] Date of Patent: Feb. 1, 2000

[54] MULTI-STAGE TRANSACTION EXECUTED FROM MULTIPLE ATMS

[75] Inventors: Kenneth D. Gallacher, Angus; Mark M. Grossi, Dundee; Grant C. Paton, Dundee; James Piggot, Dundee, all of United Kingdom; George E. Schneider, Springboro, Ohio

[73] Assignee: NCR Corporation, Dayton, Ohio

[21] Appl. No.: 08/778,340

[22] Filed: Jan. 2, 1997

[51] Int. Cl.[7] ................................................ G06F 17/60
[52] U.S. Cl. ........................... 705/43; 705/38; 705/42; 235/379; 235/380
[58] Field of Search ................................. 705/38, 39, 42, 705/43; 235/379, 380; 902/24, 39, 40

[56] References Cited

U.S. PATENT DOCUMENTS

| | | | |
|---|---|---|---|
| 4,319,336 | 3/1982 | Anderson et al. | 705/21 |
| 4,484,304 | 11/1984 | Anderson et al. | 705/21 |
| 5,010,238 | 4/1991 | Kandono et al. | 235/379 |
| 5,025,373 | 6/1991 | Keyser, Jr. et al. | 705/35 |
| 5,231,571 | 7/1993 | D'Agostino . | |
| 5,576,951 | 11/1996 | Lockwood | 705/27 |
| 5,604,341 | 2/1997 | Grossi et al. | 235/379 |
| 5,661,283 | 8/1997 | Gallacher et al. | 235/379 |
| 5,780,825 | 7/1998 | Sato et al. | 235/379 |

OTHER PUBLICATIONS

"Trade it Yourself Bank Machines Make a Debut", Los Angeles Times, Home Edition, Business section, p. 1, col. 5, Oct. 1994.

"ATMs May Give Banks Added Firepower in Funds War", American Banker, vol. 158, No. 77, Apr. 1993.

*Primary Examiner*—Allen R. MacDonald
*Assistant Examiner*—Hani M. Kazimi
*Attorney, Agent, or Firm*—Gregory A. Welte

[57] ABSTRACT

A system of ATMs wherein a customer can execute a complex transaction in stages, at different times, and perhaps at different ATMs. Considering a loan application as an example, a customer can supply part of the information required by the loan application at one ATM, and can supply other information at a later time, at the same, or another, ATM. While the customer is present at any ATM, or afterward, the invention undertakes processing required by the loan application, such as ordering credit reports.

18 Claims, 12 Drawing Sheets

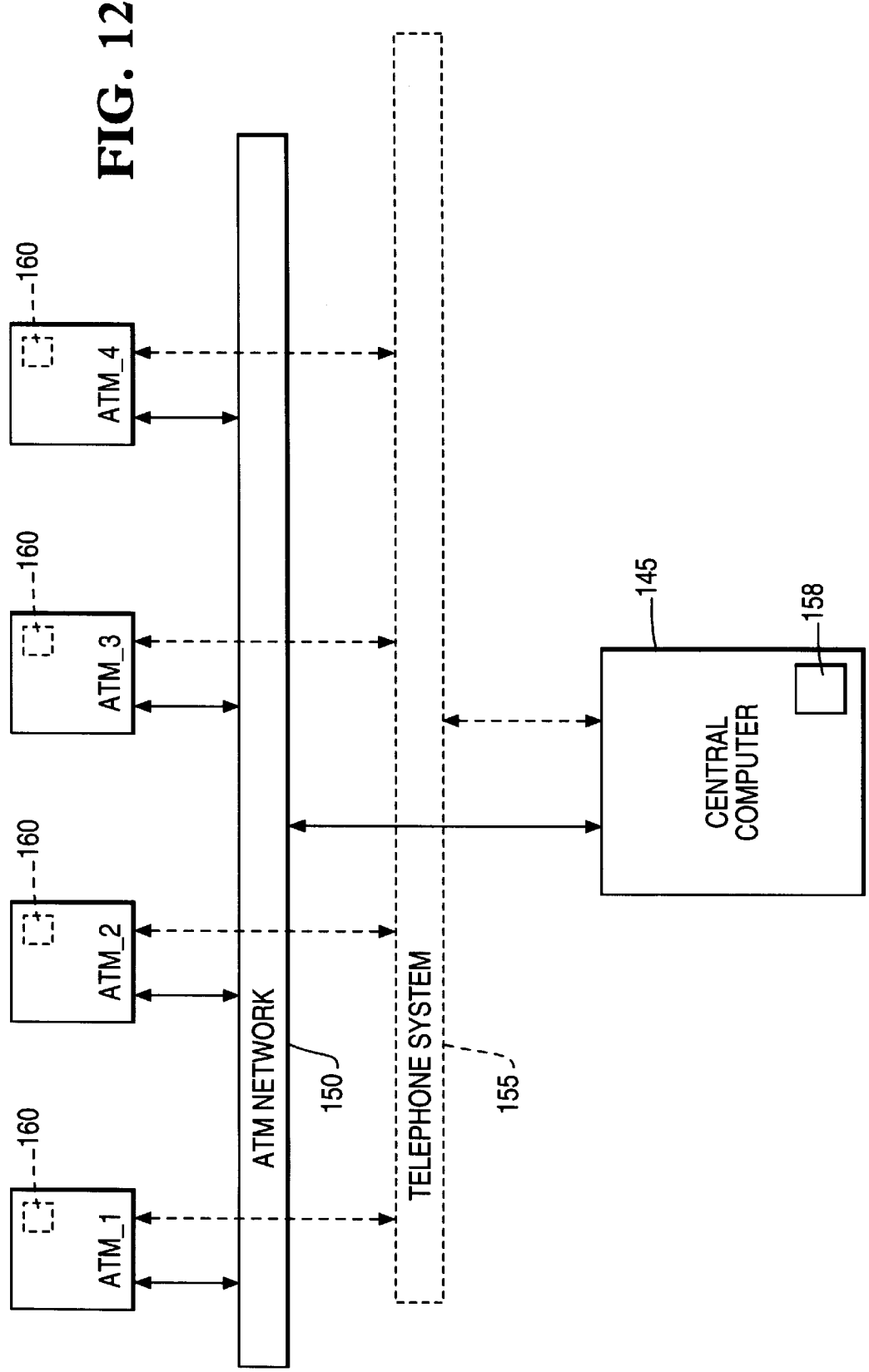

MULTI-STAGE TRANSACTION EXECUTED FROM MULTIPLE ATMS

The invention concerns executing a multi-stage transaction from one, or more, Automated Teller Machines (ATMs).

BACKGROUND OF THE INVENTION

Historically, Automated Teller Machines (ATMs) have been used primarily for routine operations such as dispensing cash, making cash advances, providing account balance information, and the like. The capabilities of the machines have been limited to the routine duties of a bank teller, consistent with the designation "Automated Teller Machine."

These routine duties typically include single, discrete transactions, such as cash withdrawals, bank deposits, balance inquiries, and the like. The transactions are considered discrete because the transaction exists only while a customer is present at the ATM: once the customer departs the ATM, the transaction terminates, and is no longer in existence.

The Inventors believe that the usefulness of ATMs can be enhanced by extending their capabilities beyond discrete transactions, to transactions which are more lengthy and complex.

OBJECTS OF THE INVENTION

An object of the invention is to provide an improved ATM.

A further object of the invention is to provide a system of ATMs which allows a customer, at different times, to handle different stages of a complex transaction.

SUMMARY OF THE INVENTION

In one form of the invention, a customer of an ATM handles one part of a complex transaction and, at a later time, the customer, using the same ATM, or another, handles another part of the same transaction.

BRIEF DESCRIPTION OF THE DRAWINGS

FIG. 12 illustrates an architecture implementing one form of the invention.

DETAILED DESCRIPTION OF THE INVENTION

Figure 1:
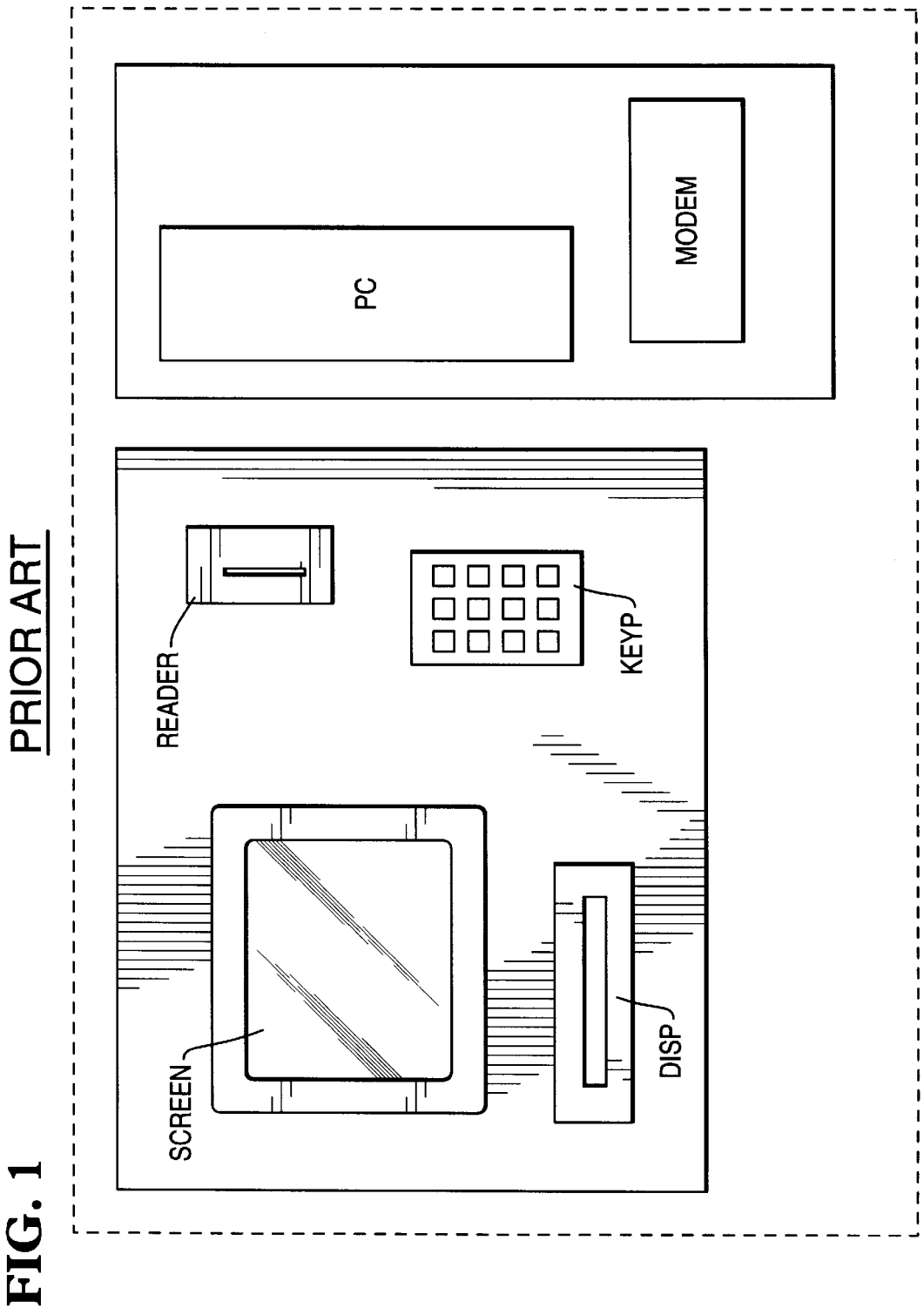
FIG. 1 illustrates selected equipment contained in a prior-art ATM.

FIG. 1 illustrates, in schematic form, some of the equipment contained in a prior-art Automated Teller Machine (ATM). The equipment includes a Personal Computer (PC) and a MODEM. The latter allows the PC to communicate with the financial institution which owns the ATM.

The equipment also includes the following:

A magnetic card READER, which reads an identification card presented by a user of the ATM.

A keypad, labeled KEYP, which allows a user to enter data.

A dispenser, labeled DISP, which dispenses currency to the customer.

A video display, labeled SCREEN, which allows the PC to display information to the customer.

Figure 2:
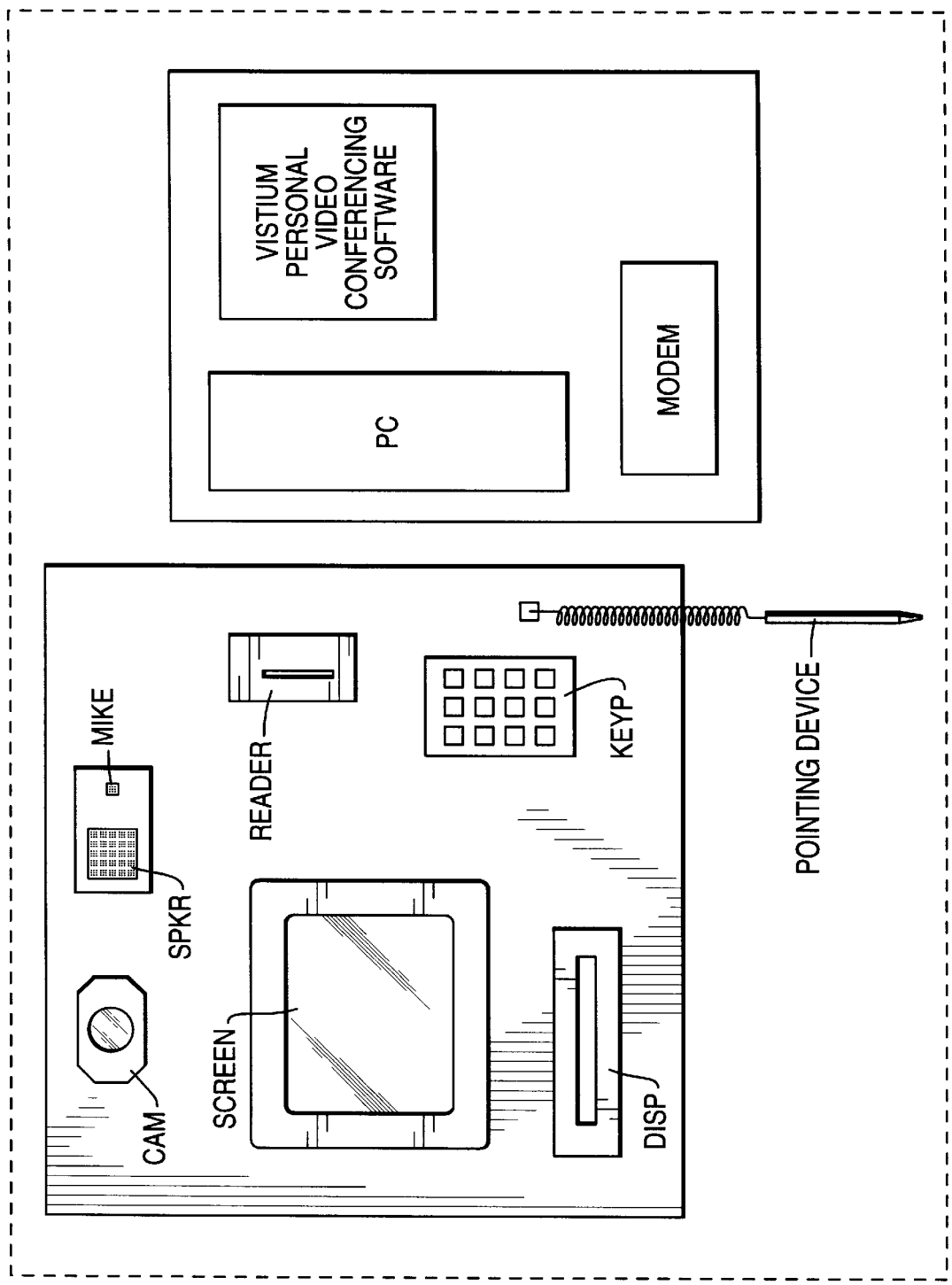
FIG. 2 illustrates equipment which can be added to the equipment of FIG. 1.

One form of the invention adds the equipment shown in FIG. 2. This added equipment includes the following:

A video camera, labeled CAM.

An audio speaker, labeled SPKR.

An audio microphone, labeled MIKE.

A POINTING DEVICE, such as a light pen, pen-type trackball, or mouse.

VISTIUM PERSONAL VIDEO CONFERENCING SOFTWARE, which is a commercially available product, which can be purchased from Picturetel, Waltham, Mass. Two other types of video conferencing software are PROSHARE, which is commercially available from INTEL, Santa Clara, Calif., and LAKES, which is commercially available from IBM, Armonk, N.Y.

Figure 3:
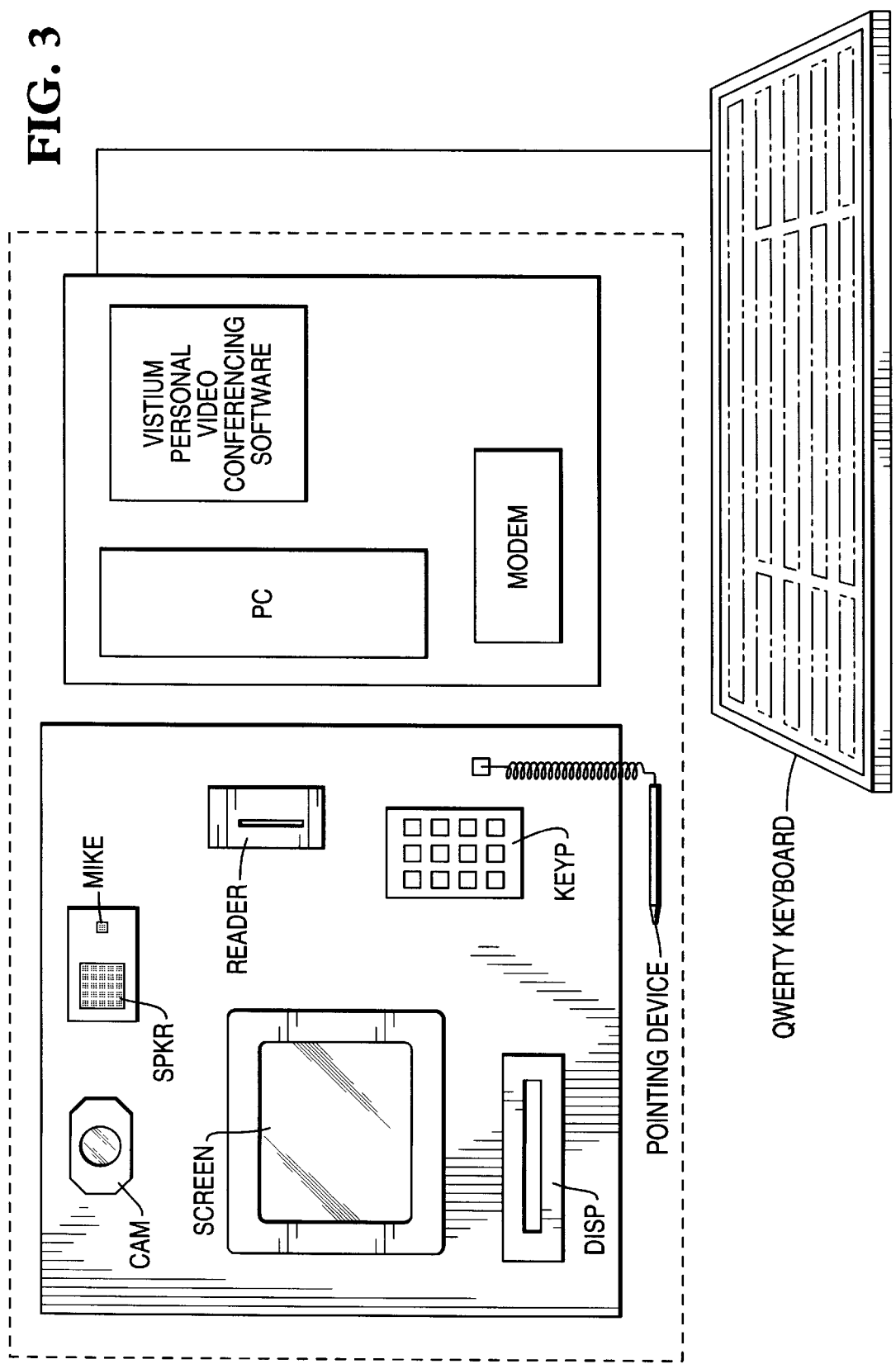
FIG. 3 repeats FIG. 2, but adds a QWERTY KEYBOARD.

A standard QWERTY KEYBOARD, as shown in FIG. 3, can be added, perhaps in replacement of the keypad KEYP.

The keypad KEYP need not be discrete component, but can be integrated into the display DISP, by using a touch-sensitive screen within the display.

Figure 4:
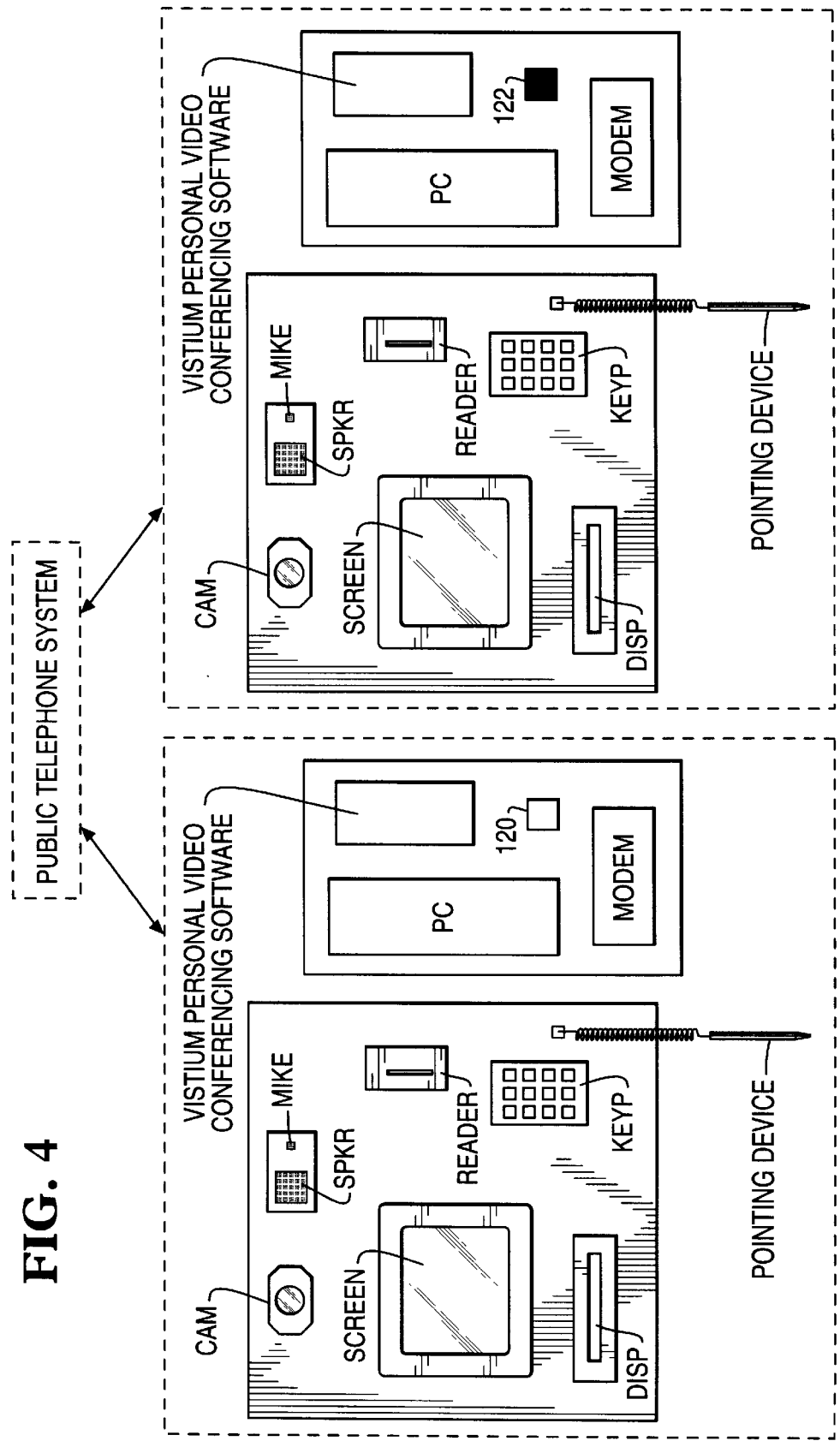
FIG. 4 illustrates two ATMs, of the type shown in FIG. 2, linked by a common-carrier telephone channel, and thereby able to undertake a video conference.
Figure 5:
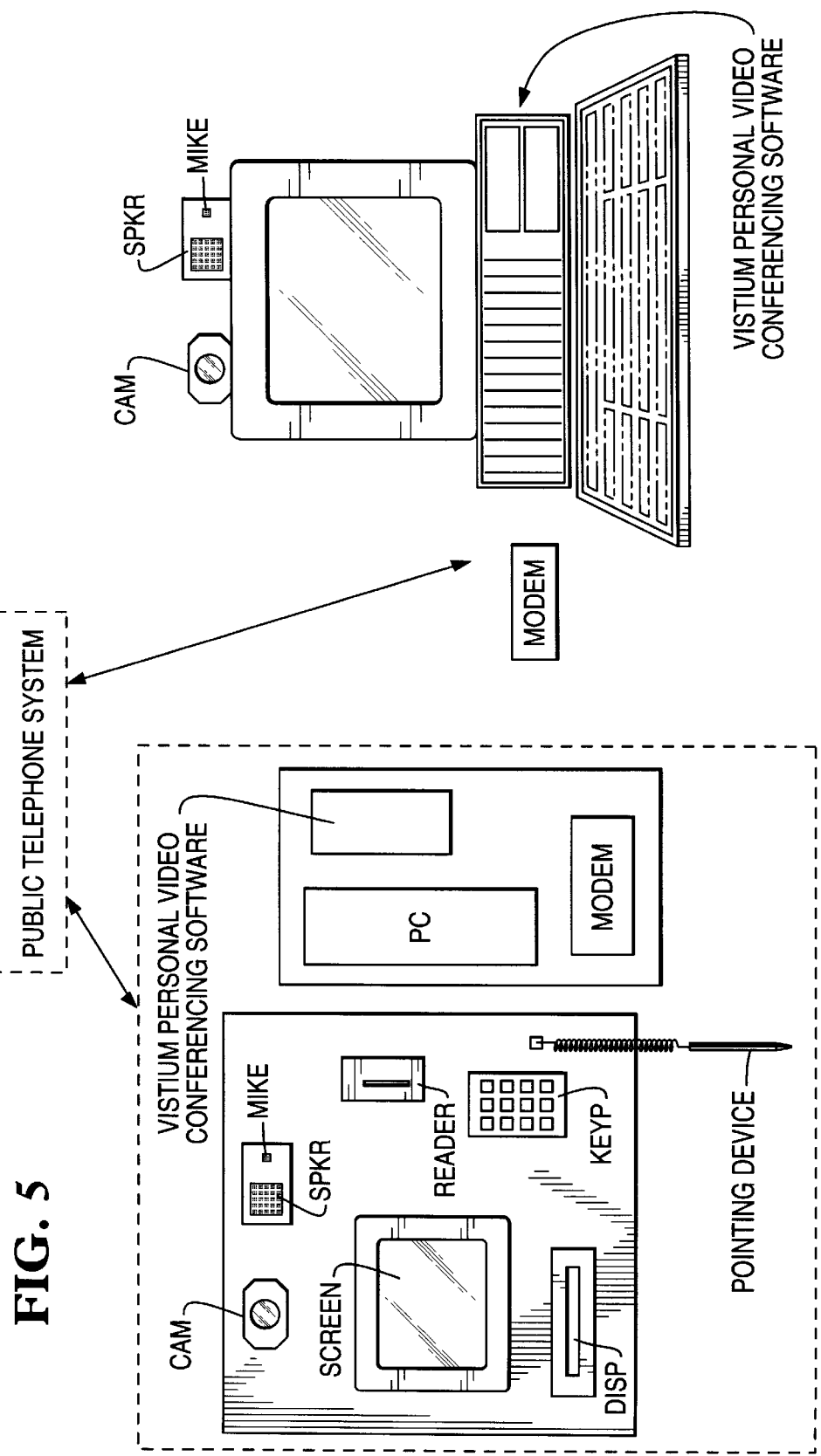
FIG. 5 is similar to FIG. 4, but with the exception that a video conference is held between an ATM and a computer which is not part of an ATM.

This equipment allows a user of the ATM to establish a video conference with another ATM, which is similarly equipped, as shown in FIG. 4. Also, as shown in FIG. 5, the equipment allows a user of the ATM to hold a video conference with any computer (and not solely with another ATM), if properly equipped, such as one located within the offices of the financial institution which owns the ATM.

(The POINTING DEVICE is, strictly, not required to establish the video conference. Also, the SPKR and MIKE can be replaced by a standard telephone handset, if desired.)

In a video conference, each party can speak to, and hear, the other, by means of the speaker SPKR and microphone MIKE in FIG. 4. Also, each party can see, on the SCREEN, the image which is captured by the camera CAM of the other party. This image can include the face of the other party, or an object, such as a document, which the other party presents to the camera CAM.

Dialing the telephone number of the other party is handled by the VISTIUM system. The ATM can be designed to dial a default number, such as that of the financial institution which owns the ATM, or to allow the customer to select the customer's own choice of number.

Loan Application via Video Conference

Figure 6:
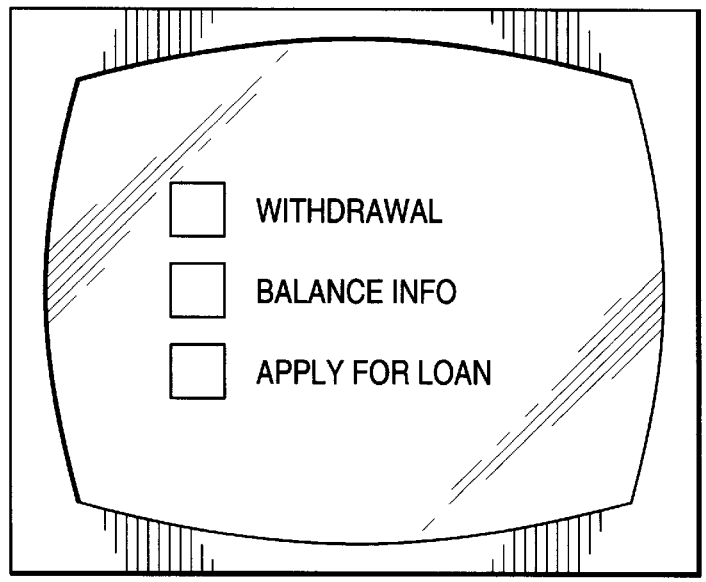
FIG. 6 illustrates a screen which the invention generates, in order to allow a customer to initiate a loan application.

After a customer logs on to the ATM, the customer selects an option which initiates a loan application procedure, possible by using the screen shown in FIG. 6. The ATM responds by establishing a video conference between the ATM and a bank officer. During initial phases of the conference, the bank officer requests information which is sufficient to run a credit check on the customer. The bank officer relays this information to another representative of the bank, who initiates a credit check of the customer.

While the credit check is being undertaken, the bank officer obtains additional information about the customer. At some time during this procedure, the credit report will have arrived. The bank officer combines the credit report with the information obtained from the customer, does credit scoring, and then gives the customer, via the video conference connection, tentative approval of the loan.

At this point, paper forms need to be completed, which are mailed to the customer for completion and return to the bank.

Automated Loan Application

A user can log on to the ATM of FIG. 2 by presenting a pass-card to the card reader READER, and typing a password on the keyboard, in the usual manner.

In a preferred embodiment, the keyboard takes the form of a touch-screen keypad, known in the art, which is presented on the display.

After the user logs on, the ATM presents a series of choices, such as those indicated in FIG. 6. All but one of the choices represent prior-art ATM functions. The one difference is the choice "APPLY FOR LOAN."

Figure 6A:
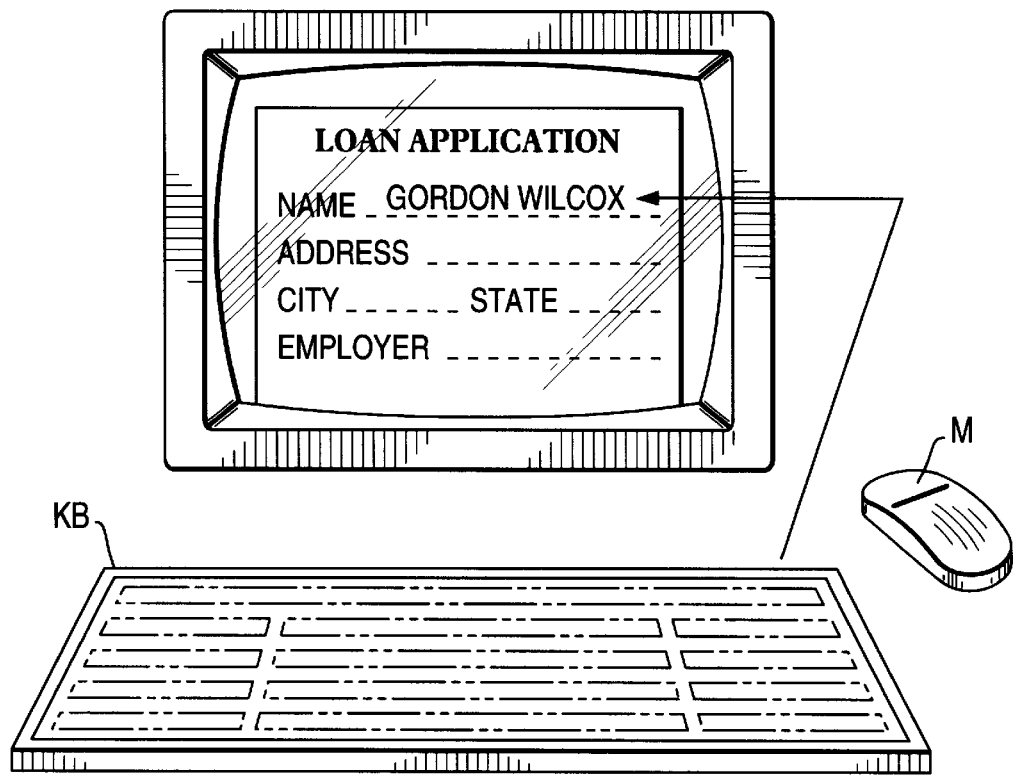
FIG. 6A illustrates a screen presented by a form-filling program.

If the customer selects this choice, the ATM presents a blank form on the display, as shown in FIG. 6A. The customer fills the blanks, by using the keyboard. The blank for is generated using the collaboration feature of the VISTIUM system, which runs a form-completion application program. Such programs are commercially available.

Invention Performs Credit Check While Customer Fills Out Form

As the customer fills the blanks in the form, the ATM, or an associated system, such as a computer at the bank which supervises the ATM, dials up one or more credit reporting agencies, and requests credit reports on the customer. In order to obtain the credit reports, the customer must be identified in a manner understandable to the credit reporting agency, because the credit reporting agencies catalog their information according to codes such as social security numbers, rather than by customer name.

Figure 7:
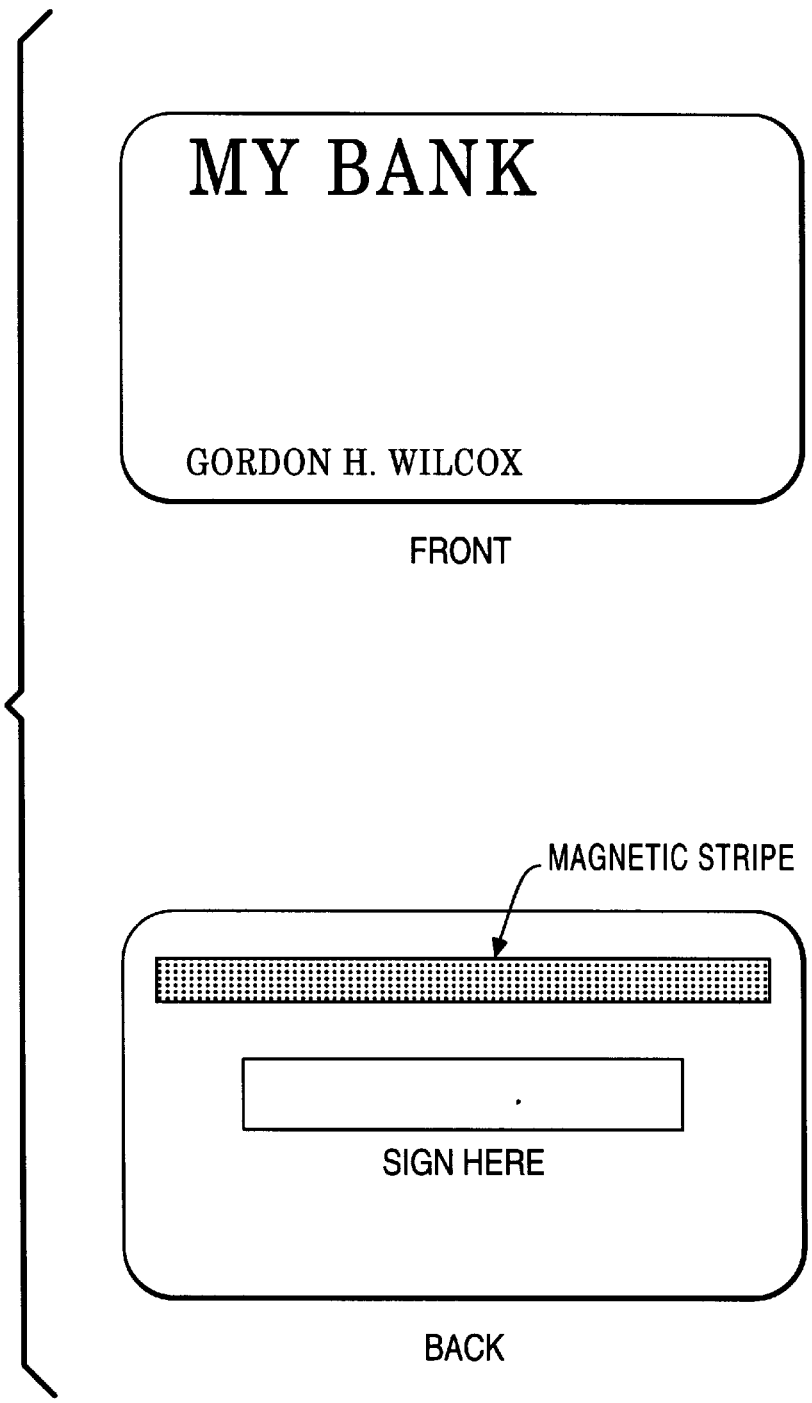
FIG. 7 illustrates the FRONT and BACK of an identification card used to log onto an ATM.

Two simple approaches to obtaining the identifying code of the customer are the following. One is to encode the identifying information onto the pass-card itself. FIG. 7 illustrates such a pass-card. The magnetic stripe of the card carries the necessary information required by a credit reporting agency.

However, not all cards presently carry such information. Further, customers may object to such information on their cards. Another approach is to maintain a table, either within the ATM or a facility to which the ATM has access, which cross-indexes the required codes with data existing on the customer's pass-card.

Figure 8:
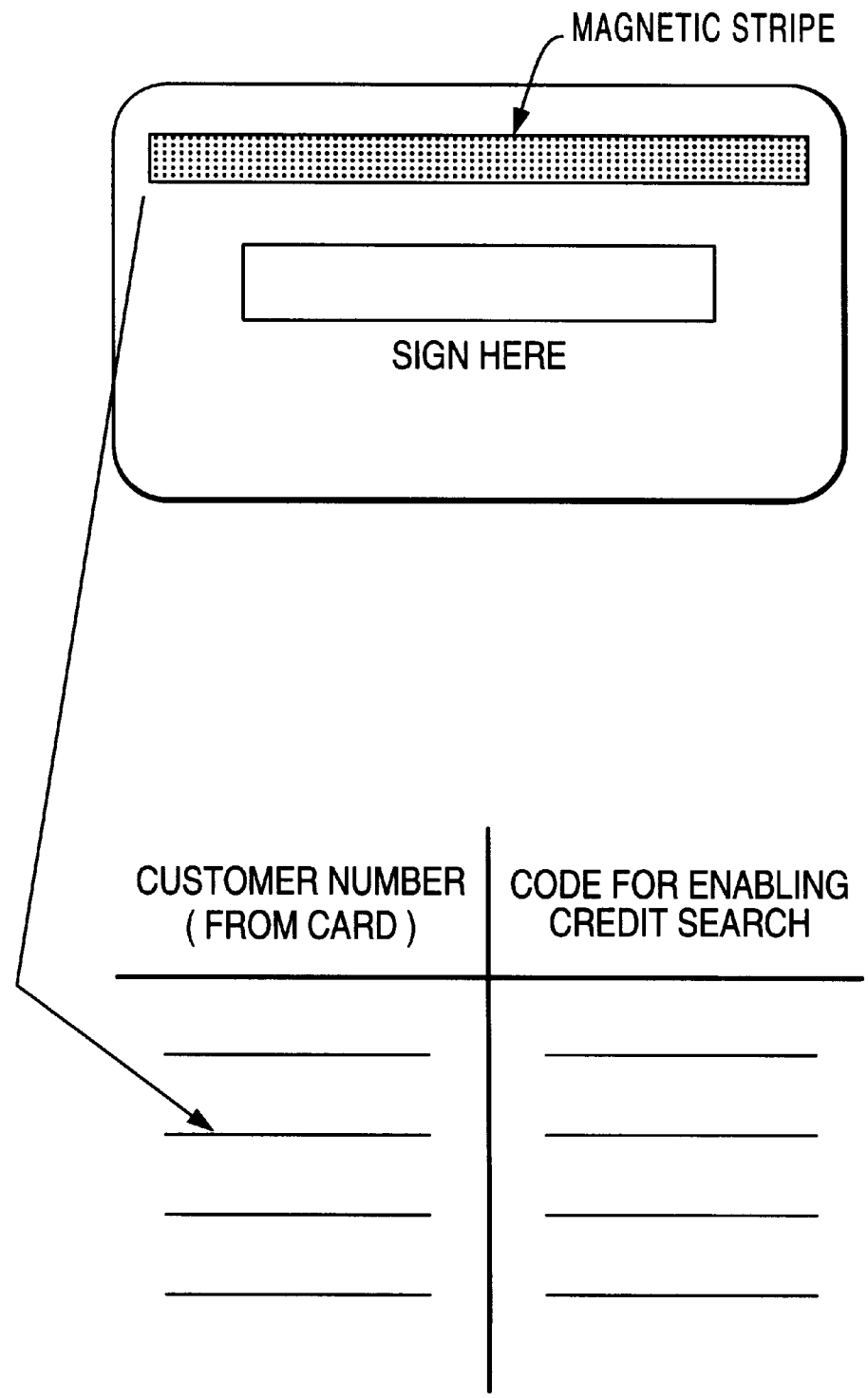
FIG. 8 illustrates how a look-up table can derive information which allows a credit search to be run, based on customer information contained on the identification card of FIG. 7.

FIG. 8 illustrates this principle. In this approach, the pass-card in FIG. 8 contains only information needed by the bank in its internal record keeping. The pass-card does not contain information which enables credit reporting to be done. To obtain a credit report, the ATM reads the pass-card and uses the table of FIG. 8 to find the data required for running a credit search.

Invention Itself Can Approve Some Loans Bank Officer Required for Others

In some cases, after the customer has completed the form, and the credit reports have been obtained, the computer system itself may approve the loan application, without intervention by a bank officer. For example, the lender may maintain a multi-tiered structure for loan approvals, some of which can be approved by the invention, and others of which require an officer's review.

Tier 1

One tier may involve small loans. The bank establishes approval criteria, and the invention ascertains whether the criteria are met, based on the application, made at the ATM, and the credit report.

As a highly simplified example, the criteria may be that, for a loan of $5,000.00, the applicant must (A) own a credit rating minimum of "B," (B) own a house, and (C) have been employed for at least two years by the same employer. If the application process, completed at the ATM, indicates that the criteria are met, then the system approves the loan, and credits the applicant's account, or issues a check for the loan amount.

Other tiers have different criteria, and may require a bank officer's intervention for approval.

Important Considerations

1. "VISTIUM" ALLOWS FORM PROGRAM TO RUN. Running the form-completion program at the ATM, and then transmitting the completed form to the lending institution can be accomplished by the commercially available product known as the VISTIUM PERSONAL VIDEO CONFERENCING SOFTWARE, discussed above.

This product provides video-conferencing capability, using standard personal computers, which are based on the x86 processor, available from Intel Corporation, Santa Clara, Calif. In addition, this product allows multiple users, running different computers, to share a computer program. Under sharing, which is also called collaboration, a single program (a) runs on one of the computers, (b) accepts input from that computer, and (c) generates an image on the display of that computer, in the usual manner.

VISTIUM replicates that display on the displays of all other computers, so that all users see a common display. Further, VISTIUM allows "collaboration," in which all users (or selected users) provide input to the program. As a result, any user can operate the program, and all users simultaneously witness the operation of the program. When a collaborative conference is finished, the final product of the collaboration, such as a document contained in a data file, can be made available to all users.

Under the invention, the form-filling program is the shared program. (However, a large amount of collaboration is not expected in general. It is expected that the bank officer will have little, or no, involvement in completing the form, and will thus not collaborate to a large extent.)

It is possible to allow the customer to complete the application without holding a video conference. After the customer completes the application, the file representing the application is transmitted to the lending institution, by VISTIUM.

2. LOAN CAN BE APPROVED WITHOUT HUMAN INTERVENTION. In one form of the invention, the loan process is fully computerized. The invention gathers information for a loan application from an applicant located at an ATM, and orders a credit report, which is delivered in computer-readable format. The invention assigns weights to various factors, such as credit rating, income, employment history, etc., and arrives at a total point score in evaluating the application.

If the point score exceeds a minimum, then the invention approves the loan, and funds are disbursed without significant review by a bank officer. (A cursory review may be undertaken to check for large errors, but this is expected to be small, in the range of five minutes maximum.)

However, the invention is not restricted to this purely automated operation. The invention can gather the required information, without human assistance, and when sufficient information is obtained, can relay the information to a loan officer for analysis. One type of sufficient information consists of the loan application, completed at the ATM, together with the required credit reports.

3. REQUESTING CASH ADVANCE IS NOT APPLICATION FOR LOAN. The invention should not be confused with existing systems which extend cash advances to a customer of an ATM. For example, banks provide checking accounts having overdraft protection. When a person writes a check which is not covered by funds, the overdraft protection adds funds to the account, and covers the check.

The overdraft protection can also be invoked at an ATM. A person can obtain currency from an ATM, by way of a cash advance under overdraft protection, even if the person's underlying account lacks sufficient funds to provide the currency.

There are at least two significant differences between such cash advances and the present invention. One is that, under the cash advance/overdraft protection approach, a "line of credit" has been previously approved. That is, the loan application has been previously processed, and approved. There is no loan application procedure, except in the possible sense that asking for a cash advance amounts to applying for a loan, which is, technically, incorrect in the present context.

The second reason is that, under the invention, no physical currency is actually delivered to the customer. Some reasons are the following:

One reason is that the amounts of money involved are so large that it is considered unwise for a person to carry them in public.

Another is that technical difficulties exist in providing such large amounts of currency to customers using an ATM. For example, assume a loan of ten thousand dollars. If currency were to be delivered, large denominations, such as one-hundred dollar bills, or thousand-dollar bills, would be preferred. However, these large denominations are not generally desired by other customers of the ATM. Consequently, a stock of large-denomination bills must be held in the ATM, together with (possibly) additional dispensing equipment for the (mostly unused) large denominations.

A third reason is that storage of large amounts of currency within the ATMs presents a stocking problem (armored cars would be required to carry the currency, and load the ATMs) as well as a security problem: burglars would be tempted.

Therefore, the invention does not deliver currency to the customer. Instead, the invention credits the customer's account, or prepares a bank check for the customer.

4. INVENTION MAKES LOANS WHICH EXCEED THE CURRENCY CAPACITY OF ATM. One distinguishing feature of the invention over the cash advance approach is that the invention is capable of making loans which exceed the amount of currency stored within the ATM at which application for the loan is made. For example, an ATM may hold $50,000.00. The invention is capable of approving loans which exceed this value, and which, in general, are not related to, nor limited by, the storage capacity of the ATM.

Of course, once a loan is approved, and funds placed into a customer's account, it may be possible for the customer to withdraw physical currency from an ATM, but subject to normal ATM withdrawal limits.

Additional Embodiment

In another embodiment, the customer engages in a transaction which can be divided into stages. The customer executes each stage of the transaction at different times, from one of several available ATMs.

Figure 9:
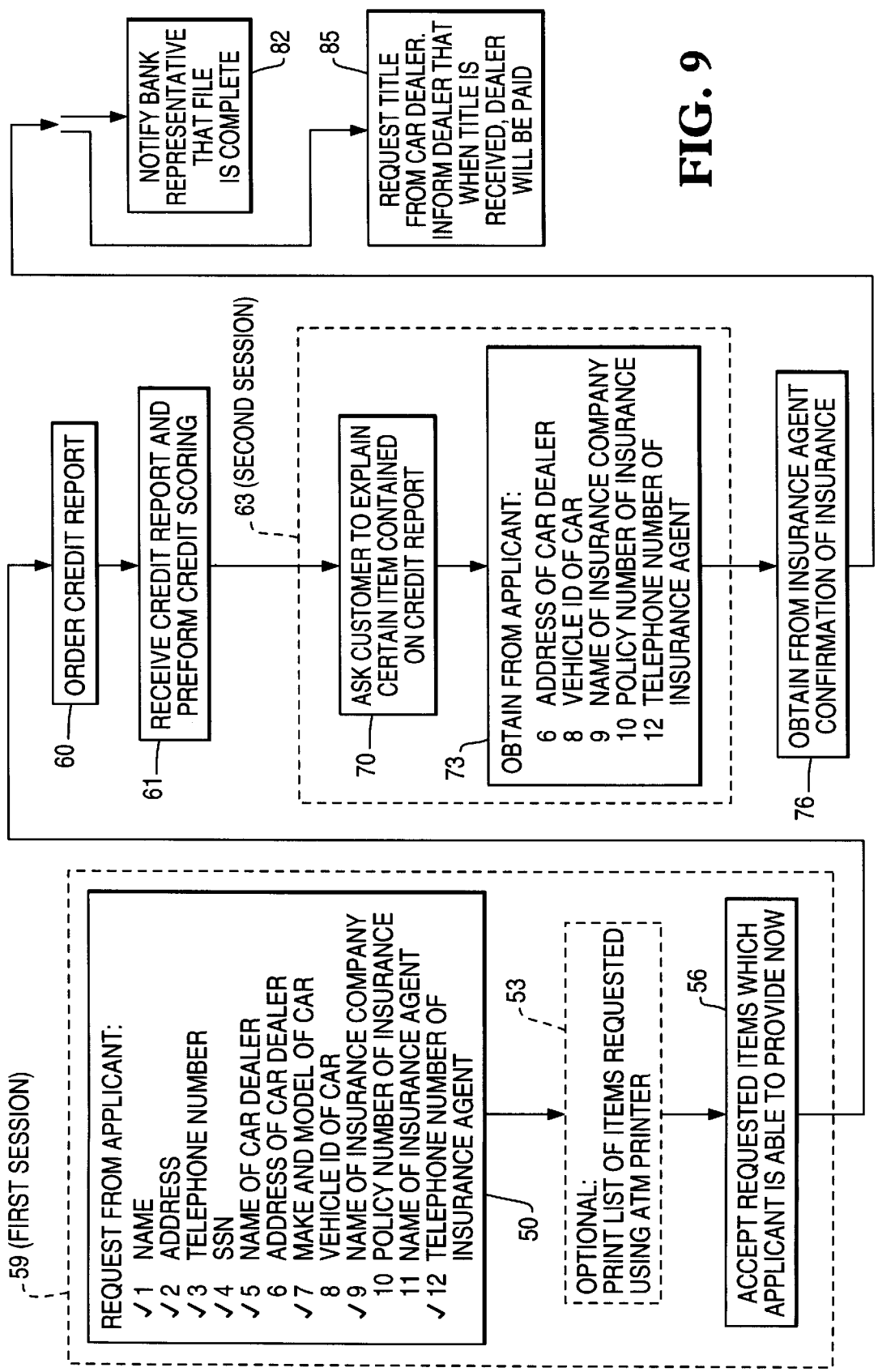
FIGS. 9–11 are flow charts illustrating logic implemented by various forms of the invention.

For example, assume that the customer wishes to purchase an automobile, and wishes to finance the automobile through a bank loan. FIG. 9 illustrates a hypothetical flow chart illustrating a sequence of events which the invention undertakes. Block 50 indicates a list of information items which the customer is requested to provide, in completing the loan application.

For the convenience of the customer, as indicated by dashed block 53, the invention can print the list of items indicated in block 50. (Alternately, if the customer provides some of the items immediately, as explained below, then the printed list may contain only the remaining items required of the customer.) This printing process can be accomplished using the printer contained within the ATM, which is ordinarily used to print receipts.

Returning to the list of block 50, it is likely that the customer does not keep in memory all of the items of information requested, but instead knows only some of the items, such as those indicated by the check marks, namely, items 1–5, 7, 9, and 11. As indicated by block 56, the customer provides these items to the ATM, and does so by way of the QWERTY keyboard shown in FIG. 3.

As an alternative to using the keyboard to enter information, the customer can speak the information requested. In this case, the invention digitizes the customer's speech, stores the speech as a digitized audio file, and transmits the audio file to the financial institution handling the loan, via the telephone connection discussed above. A human transcriber located at the financial institution can later listen to the audio file, and manually enter the digitized speech into the customer's file.

As dashed block 59 indicates, the steps described above are accomplished during a first session of the customer with an ATM, after which the customer departs the ATM. At this time, the invention orders a credit report, from a credit reporting agency, as indicated by block 60 (assuming that the customer has supplied information necessary to obtain this report, such as the customer's Social Security Number, SSN). This order can occur after the first session has terminated, as indicated by the relative position of block 60 within the flow chart, or during the first session 59.

The credit report is ordered by a computer process. When the invention receives the report, the invention performs what is known as "credit scoring," which is a ranking of the customer's credit worthiness, as on a scale ranging from zero to 100, as indicated by block 61.

After the customer terminates the first session 59, and departs the ATM, the customer will obtain additional information required by the loan application. Then the customer can undertake a second session, as indicated by dotted block 63. This second session can occur at the same ATM as did the first session 59, or at another ATM.

In the second session, the customer provides additional information, which was not known during the first session, as indicated by the items contained in block 73. In addition, the invention may ask the customer to provide supplementary information, which was not requested at the first session, as indicated by block 73.

"Supplemental information" refers, for example, to information for which a need arose, based on processing which the invention undertook after a previous session. For example, the credit report may indicate a certain irregularity. The existence of this irregularity may not have been known during the first session 59. Block 70 indicates that, during the second session, the invention asks the customer to explain the irregularity, by providing supplemental information. The customer may provide the explanation either using the keyboard, or by speaking, as explained above.

When the second session 63 terminates, block 76 is reached. This block indicates that the invention obtains from the customer's insurance agent a confirmation that the customer possesses proper insurance on the automobile to be purchased. This confirmation could not be obtained earlier, because the telephone number of the insurance agent, who provides the confirmation, was not available to the invention until block 73 was reached. This confirmation is obtained by a computer process, such as by a computer program sending an electronic mail message to the insurance agent.

If the insurance agent is not equipped with electronic mail, one of several alternate courses is taken. As one example, the invention can cause a printer in the mail room of the bank operating the invention to print a letter requesting confirmation. The letter is deposited into a hopper by the printer, and the letter is then mailed in the usual course of business by a bank employee.

As a second example, the invention can make a telephone call to the insurance agent, and leave a recorded telephone message, which is generated by computer. Systems for leaving such messages are known in the art.

As a third example, the invention can send a FAX to the insurance agent, by way of a computer process. In this example, the customer would be required to supply the FAX number of the insurance agent in block 50. Sending such FAXes is known in the art.

Irrespective of how the request is delivered to the insurance agent, the request asks for a confirmation-of-insurance in a form which is directly understandable by a computer process. For example, the request can ask that the confirmation take the form of an electronic mail message having a particular sequence of characters following the header of the message, and then followed by a specific code which confirms insurance coverage. For instance, the sequence may be

ABC ABC ABC ABC ABC and the specific code may be

COVERAGE EXISTS.

The sequence and the code can be easily read by the computer process implementing the invention, when the electronic mail message arrives, since the electronic mail message takes the form of a sequence of ASCII characters.

If the insurance agent sends a paper response instead, an agent of the bank reads the response, and enters the appropriate data into the customer's application.

Block 76 represents the last processing step in completing the customer's application. The logic then proceeds either to block 82 or block 85. In the former case, the customer's application is turned over to a bank loan officer, who completes processing the application in the usual manner. Preferably, the computer process handling the application determines when the application is complete, and turns over the application to the loan officer only at that time.

In the latter case of block 85, the invention finalizes the loan transaction without further human intervention. For example, if the computer process approves the loan, the invention may send a message to the automobile dealer, requesting the dealer to transmit the title, or other evidence of the bank's security interest, to the bank. This message states that, when the title is received, the bank will transmit an appropriate check to the dealer. Because the dealer views the bank as trustworthy, the dealer is willing to release the automobile to the customer, and await payment from the bank. It is expected that a bank employee will examine the title when it arrives, and give assent to issuance of the check to the dealer.

Significant Features

1. As indicated in FIG. 9, the customer interacts with the bank, through an ATM, during two (or more) separate sessions. During these sessions, the customer provides information requested by the bank. This information can be grouped into two classes.

One class is information which is required from all customers, as indicated by the hypothetical list of information shown in block 50. This list represents a standard collection of information which would be gathered on a standard loan application form. The contents of the list is determined in advance, and represents a standard collection of information which the administrators of the bank consider relevant to the loan transaction. All loan applicants are requested to provide this information, although, of course, exceptions are made for certain applicants.

The second class is information which is requested, not based on a predetermined list, but based on processing which the invention undertakes, in response to information provided by the customer. One example of such processing is the credit scoring indicated by block 61. That scoring uncovered a situation about which more information was needed. This information was requested by block 70.

Therefore, two classes of information are accepted, and accepted in different ATM sessions. One reason for accepting information in multiple sessions, as opposed to a single session, is to allow the customer to provide answers (i.e., "supplemental information") to inquiries generated by intermediate processing. This intermediate processing can be done based on (1) previous information provided by the customer, (2) information provided by another source, such as the insurance agent, or (3) other factors.

Another reason for accepting the information from the customer in multiple sessions is to allow the customer to gather information of which the customer is not presently aware, as represented by the non-checked items in block 50 in FIG. 9.

2. Point number 1, above, indicated that the bank received two classes of information from the customer: (1) the predetermined items of block 50, which are requested of all customers, and (2) supplemental information, which is not required of all customers. In addition, the bank receives information from third parties. Two examples are (1) the credit report of block 60 and (2) the confirmation of insurance of block 76. Preferably, the information from third parties is requested automatically by the computer processes which implement the invention, as by using electronic mail, automated telephone messages, computer FAXes, etc.

3. The intermediate processing, such as that indicated by blocks 60 and 61, provides an advantage which can be explained by one alternative approach. In the alternate approach, all information is first gathered by the invention, and then processing of the information is undertaken. No processing is undertaken until all information has been gathered.

However, in this approach, if the processing generates an inquiry such as that of block 73, wherein the credit report is found to contain a questionable item, then the overall transaction becomes delayed, until the customer satisfies the inquiry, or the questionable item is waived by a bank representative. The invention reduces, or eliminates, this delay by performing all individual processing steps as soon as information becomes available for those steps.

In one embodiment, the data items of block 50 are ranked in importance, and presented to the customer in ranked order. For example, a specific group of data items is treated as having primary importance, and the customer is urged to provide these items as soon as possible. For example, a credit report on the customer may be considered an absolute requirement. In this case, the customer is prompted by a message in the very first session 59, requesting information needed to obtain the credit report. As a more specific example, the very first item of data which is requested can be the SSN of the customer. As soon as that is provided, the invention can request the credit report, as indicated by block 60, while the customer is providing the remaining items of block 50.

4. It was stated above that the customer can speak some, or all, of the information requested by the ATM. This feature is considered desirable because (1) not all customers are able to type, and thus cannot use the keyboard shown in FIG. 3, and (2) some customers, who know typing, may prefer to avoid typing, for their own personal reasons.

Figure 10:
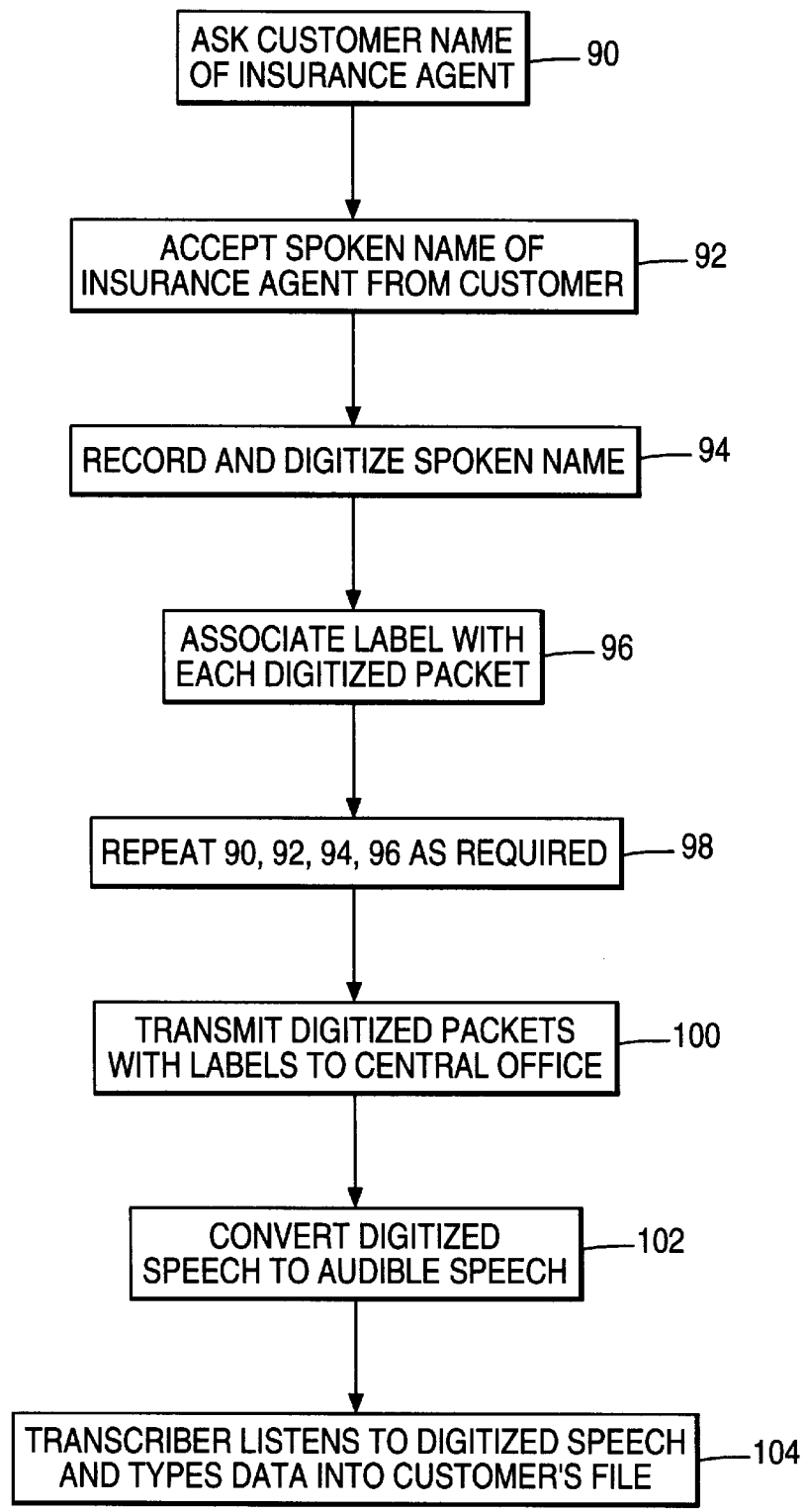

FIG. 10 illustrates a flow chart outlining a speech-acceptance process of the ATM. Block 90 indicates that the invention prompts the customer for a specific piece of information, such as the name of the customer's insurance agent, as indicated. This prompting occurs during acceptance of data from the customer, as in block 50 in FIG. 9. When the customer speaks the name, the invention receives the spoken name through the microphone MIKE shown in FIG. 2, as indicated by block 92 in FIG. 10. The invention records the spoken information, as indicated by block 94.

The recording can take the form of digitizing the spoken name. Digitizing speech is known in the art. One apparatus capable of digitizing the speech is the computer expansion card known as the "Sound Blaster," available from Creative Labs, Inc., 1901 McCarthy Boulevard, Milpitas, Calif.

The result of the digitizing operation is a sequence of numbers representing samples of the speech waveform. This sequence of numbers is a data packet. A label is associated with the data packet for storage, as indicated by block 96. The label indicates the type of information the digitized speech carries.

As indicated by block 98, the process of blocks 90, 92, 94, and 96 is repeated for other data items required by the invention. The customer can type certain items, and speak others. After all of the information has been obtained from the customer, the ATM now holds, in storage, a collection of data packets, each representing digitized speech which answers a question posed by the invention, and a label identifying the digitized speech.

As a specific example, assume that the customer speaks the first three items in block 50 in FIG. 9. Each item is stored as a labeled data packet, and the general format is [LABEL, DIGITIZED SPEECH]. The specific format of the three items of block 50 can be as follows:

PACKET 1: [CUSTOMER NAME, DIGITIZED NAME SPOKEN BY CUSTOMER];

PACKET 2: [CUSTOMER ADDRESS, DIGITIZED ADDRESS SPOKEN BY CUSTOMER];

PACKET 3: [CUSTOMER SSN, DIGITIZED SSN SPOKEN BY CUSTOMER].

Figure 11:
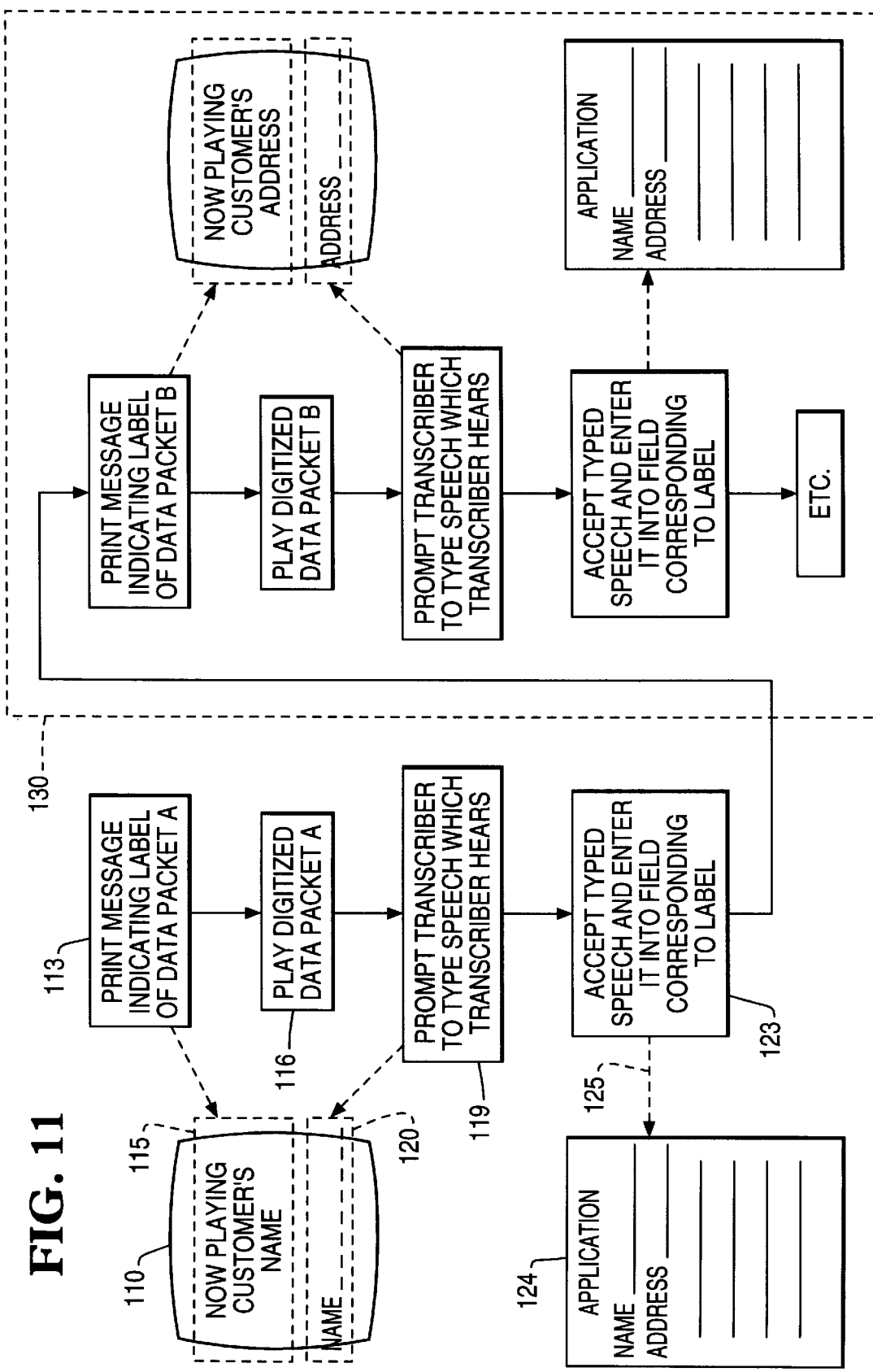

These data packets, each containing (1) digitized speech, which follows (2) a label identifying the digitized speech, are transmitted to a central office of the bank which operates the ATM, as indicated by block 100. At the central office, the data packets are converted into audible speech, for a human transcriber. The label of each packet is also presented to the transcriber, to identify the speech to which the transcriber is presently listening. FIG. 11 provides an example of the transcription process.

A computer display 110 is presented to the transcriber (not shown). As block 113 indicates, the invention reads the label of one of the data packets, and prints a message 115, indicating the label, on the display 110. In this example, the message 115 indicates that the data packet contains the customer's name. (Alternately, the label can be converted into speech, by known text-to-speech conversion equipment.)

The invention converts the digitized speech into sound, or "plays" the digitized speech, as indicated by block 116. The transcriber listens to the speech played. The invention, as indicated by block 119, prompts the transcriber to type the sound which the transcriber hears, as indicated by message 120.

After the transcriber types the sound, the invention, as indicated by block 123, accepts the alphanumeric characters typed (such as ASCII characters), and inserts them into the field of the customer's file corresponding to the label of the data packet. Arrow 125 indicates this process conceptually: in this example, the invention places the ASCII characters into the NAME field of APPLICATION 124.

The invention repeats the process for the other data packets, as indicated by the blocks contained in region 130 of FIG. 11. The overall result is similar to a situation wherein the transcriber stands beside the customer at the ATM, while the customer speaks the information requested by the invention. The transcriber listens to the customer's speech, and types the spoken words into the keyboard at the ATM. However, under the embodiment described above, the transcriber is located remote from the customer, and performs the transcription at a later time.

The digitization of the customer's speech need not occur at the ATM, but can occur at the bank's central office. In this latter case, the customer's speech is carried to the central office by the telephone system.

4. The overall loan application-and-approval process is amenable to full automation. In many loan transactions, only a few factors are considered relevant to the financial institution making the loan, such as (1) credit rating of the loan applicant, (2) income of the applicant, (3) whether the applicant is employed, and so on.

Each factor can be viewed as a variable in an equation, which is a number, and which is multiplied by a weight, which represents the relative importance of the factor. The invention, by a computer process, acquires the numbers representing each factor, computes the equation, and obtains a value for the equation. If the value exceeds a threshold, the loan is approved, without human intervention, and, for example, block 85 in FIG. 9 is executed.

If the value falls below the threshold, the invention calls for human intervention in finalizing the loan process.

5. Software accomplishing the functions indicated in FIGS. 10–12 is represented by blocks 120 and 122 in FIG. 4.

6. The discussion above explained one form of the invention in the context of a multi-stage transaction (i.e., a loan application) executed from one or more ATMs. One feature of the invention can be explained by reference to a distinguishing example. A customer of an ATM may withdraw cash, and then, later, at the same ATM, or another ATM, deposit money into the account from which the cash was withdrawn.

It may be thought that such actions involve different stages of a single transaction, in the sense that the bank's maintenance of the account represents the transaction. However, such is not the case, for at least two reasons. One reason is that a "transaction" implies a beginning, and an end. The bank's maintenance of the account has no end in the example given above, and the opening of the account (i.e., its beginning) was not undertaken at an ATM.

A second reason is that the invention contemplates transactions in which transfers other than money are significant factors. For example, in the loan application discussed above, transfer of information was a significant factor, such as transfer of the information of block 50 in FIG. 9. The information is necessary to process the loan application, which is the transaction (or a major part of it). The customer supplies information for different aspects of the transaction, from different ATMs.

This information should be distinguished from another type of information, termed herein "log-in information." Log-in information is used to ascertain a customer's identity. For example, a typical log-in of an ATM involves a customer's presentation of (1) a passcard, which carries information, and (2) a pass-word.

However, log-in information is not unique to the particular transaction which a customer undertakes at an ATM. That is, the customer provides the same log-in information, no matter what type of transaction the customer wishes to execute. Also, the log-in information is the same, for different transactions, at different ATMs.

Therefore, two distinct cash withdrawals, at two different times by a customer of and ATM, do not represent different stages of a single transaction. They are separate transactions. Further, in the cash withdrawals, information transfer (apart from log-in information) is not a significant feature.

7. Further elaborating point number 6, the invention maintains a table during the lifetime of the transaction, which lists the items of information required, such as items 1–12 in FIG. 9. For each item, the invention maintains information in the table which indicates whether the item of information has been supplied, or not. With the existence of the table, the invention, at any time, can generate a list of items which remain to be supplied (or those which have been supplied), and present this list to the customer, at an ATM.

8. The invention allows a customer to change a previously supplied data item. For example, a block, or step, can be added to the flow chart FIG. 9, which (1) asks the customer whether a change is desired, (2) presents the overall list of necessary data items, such as in block 50, (3) asks the customer to select an item, and (4) replaces, or modifies, the selected item with new data presently supplied by the customer.

This modification can be done to a data item (1) previously supplied to a different ATM, (2) previously supplied to the same ATM, but in a different session, or (3) previously supplied to the same ATM, in the same session.

In this connection, the loan application discussed above can be viewed as a database, which contains the fields indicated in block 50 in FIG. 9. For example, the name entry represents one field, the address entry represents another field, and so on. Initially, the database fields are empty, or contain default values.

The invention allows a customer to enter data into selected fields of the database, from an ATM, and then, later, to enter data into other fields, from the same, or another, ATM. Further, as explained above, the invention allows the customer to change previously supplied data.

9. FIG. 12 illustrates one architecture implementing one form of the invention. A system of multiple ATMs is provided, labeled ATM__1, ATM__2, and so on. A central bank computer 145 is provided. An ATM network 150 connects the ATMs with the computer 145, and a telephone system 155 allows the video conferencing described above. Software 158 necessary to implement the invention is contained within the system, as at computer 145. This software can be distributed, as indicated by dashed blocks 160, wherein part of the processing is performed at one, or more, of the ATMs.

Additional Considerations

1. The overall system conforms to IEEE (Institute of Electrical and Electronics Engineers) standards H.221, T.120, and H.320. The VISTIUM software generates a window on the SCREEN in FIG. 4 which conforms to CIF and QCIF standards.

Under the CIF standard, the transmitted video image occupies a window on the SCREENs of about 352 pixels horizontally, and 288 pixels vertically. (The QCIF uses a window in which each dimension is one-half that in CIF, providing one-fourth the area of CIF.) Two channels of ISDN transmission allow a transmission of 128 Kbits/sec. Of this data, 112K bits are used for video, and 16K for audio, providing a video rate of about 17 frames per second, using compression.

This rate provides substantially full-motion video, with synchronous audio. The video is not strictly pure full-motion video, because if extremely rapid motion of a subject within the video image occurs, then the full-motion becomes disrupted. However, disruption is expected to be rare, for two reasons. One, statistically speaking, such motion is expected to be infrequent in the types of video conferences under consideration.

Two, the conference participants will quickly learn that excessive, rapid motion will disrupt the video, and will naturally suppress such motion.

Therefore, the video can be described as substantially full-motion because (a) the video is, in fact, full-motion, if normal human movements are involved, and (b) the occurrences of rapid, disruptive motion, of the conference participants is expected to be minimal, or non-existent.

Based on the foregoing, as a minimum, the invention provides video conferencing at a minimum rate of 10 frames per second, with synchronous audio.

In contrast, normal telephone lines, such as those in 1986, when the Walker patent (discussed above) was filed, provide a maximum data rate of about 16 Kbits per second. The audio signal in a video conference requires about 4 Kbits per second, leaving a video data rate of about 12 Kbits per second. Thus, for a video window of comparable size to a CIF window, the frame rate for a normal telephone line must drop to about ten percent of the CIF rate, because the video data rate is about 12K, compared with 112K under the invention.

From another point of view, one particular video window used in the prior art is about 128×128 pixels in size. It is well known that, using an ordinary telephone line, a typical frame rate is in the range of 7 frames per second. If synchronous audio is also used, the frame rate drops to about 5 frames per second.

2. Important features of the VISTIUM PERSONAL VIDEO CONFERENCING SOFTWARE (earlier known as Telemedia Connection), as well as computer code which implements the remote conferencing features, are described in the following U.S. patent applications, which are hereby incorporated by reference.

"Remote Collaboration System," by Carleton, et al., Ser. No. 08/035,092, filed on Mar. 19, 1993.

"Remote Collaboration System," by Pommier, et al., Ser. No. 08/033,602, filed on Mar. 19, 1993.

"Remote Collaboration System," by Schwartz, et al., Ser. No. 08/034,313, filed on Mar. 19, 1993.

Numerous substitutions and modifications can be undertaken without departing from the true spirit and scope of the invention. What is desired to be secured by Letters Patent is the invention as defined in the following claims.

What is claimed is:

1. A method of operating a system of ATMs, comprising the following steps:
   a) at a first ATM, accepting, from a customer, first information which relates to one aspect of a multi-stage transaction; and
   b) at a second ATM, accepting, from the customer, additional information which relates to a different aspect of said multi-stage transaction.

2. Method according to claim 1, and further comprising the step of maintaining a table which indicates, for each of several data items needed for the transaction, whether the respective items have been previously supplied by the customer.

3. Method according to claim 1, wherein the transaction is a loan transaction.

4. Method according to claim 1, wherein
   A) a financial institution is a party to the transaction;
   B) the financial institution undertakes a background check of the customer, using the first information; and
   C) the additional information is requested by the financial institution, as a result of the background check.

5. Method according to claim 1, wherein
   A) a financial institution is a party to the transaction;
   B) the financial institution undertakes credit scoring of the customer, using the first information; and
   C) the additional information is requested by the financial institution, as a result of the credit scoring.

6. Method according to claim 1, wherein
   A) a financial institution is a party to the transaction;
   B) the transaction involves multiple events, some of which require participation of third parties, other than the financial institution and the customer;
   C) the financial institution undertakes at least one event with a third party using the first information, and prior to receipt of the additional information.

7. Method according to claim 6, wherein said events include one, or more, of the following:
   1) obtaining a credit report from a credit reporting agency;
   2) obtaining confirmation that insurance exists on collateral; or
   3) transmitting a message promising payment to a dealer selling merchandise to the customer.

8. Method according to claim 1, wherein a financial institution is a party to the transaction, and the information provided by the customer contain two types of information:
   A) type 1 information, which is required of all customers who engage in the transaction; and
   B) type 2 information, which is requested of selected customers.

9. Method according to claim 8, wherein the type 2 information is requested based on results of processing type 1 information.

10. Method according to claim 1, wherein credit scoring of the customer is undertaken using the first information, and prior to receipt of the additional information.

11. Method according to claim 10, wherein the additional information is requested of the customer, based on results of the credit scoring.

12. System according to claim 1, and further comprising the step of accepting, at the second ATM, modifications to the information provided at the first ATM.

13. A method of executing a multi-stage transaction using a system of ATMs, comprising the following steps:
   a) at a first ATM, accepting first information from a customer, which relates to the multi-stage transaction, and evaluating the first information without human intervention; and
   b) at a second ATM, accepting supplemental information in another stage of the multi-stage transaction, which supplements the first information.

14. A system, comprising:
   a) a first ATM;
   b) a second ATM; and
   c) means for
      i) maintaining a database having fields for data items;
      ii) accepting, in a multi-stage transaction, first data items from a customer at the first ATM and inserting the first data items into fields within the database which are selected by the customer; and
      iii) accepting, in said multi-stage transaction, second data items from the same customer at the second ATM and inserting the second data items into fields within the database, which database contains the first data items, and which fields are selected by the customer.

15. System according to claim 14, and further comprising means for allowing a previously accepted data item entered at another ATM to be later modified by input from an ATM.

16. System according to claim 14, wherein
   A) a financial institution maintains the first and second ATMs;
   B) the customer maintains an account with the financial institution;
   C) the first and second data items are provided in connection with a transaction undertaken by the customer; and
   D) entry of data into the database by the customer terminates when the transaction is complete.

17. System according to claim 16, wherein the customer maintains the account after completion of the transaction.

18. A method of operating a system of ATMs, comprising the following steps:

a) at a first ATM, undertaking an initiation step for a transaction with a customer, said transaction requiring multiple stages for completion, some of which stages require interaction with third parties;

b) accepting first information from the customer in the initiation step;

c) using said first information, executing at least one of said stages with a third party; and d) accepting supplemental information from the customer at a second ATM, and using the supplemental information in executing another stage with another third party.

* * * * *